Nov. 1, 1955    H. O. JOHNSON    2,722,079
FISHING LURE
Filed June 19, 1952
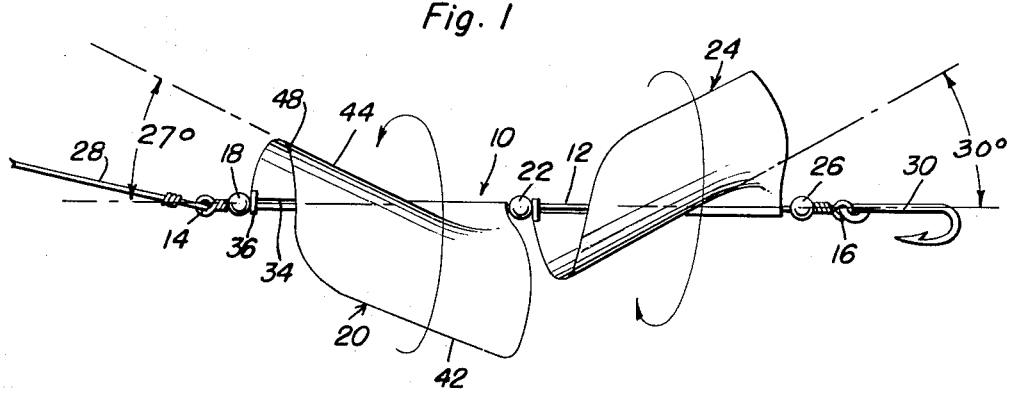
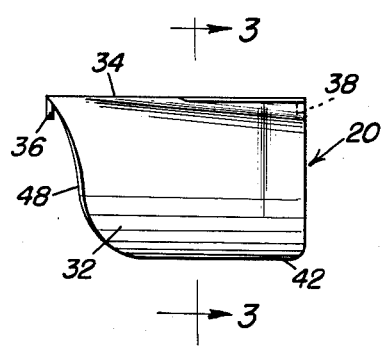
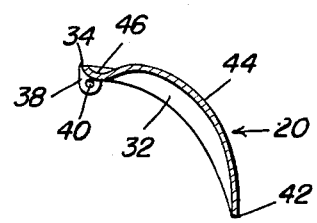
Hjalmer O. Johnson
INVENTOR.

United States Patent Office 2,722,079
Patented Nov. 1, 1955

2,722,079

FISHING LURE

Hjalmer O. Johnson, Rudd, Iowa

Application June 19, 1952, Serial No. 294,329

1 Claim. (Cl. 43—42.14)

This invention relates in general to fishing tackle, and more specifically to a spinner type fishing lure.

The primary object of this invention is to provide an improved spinner type fishing lure which when moved through a body of water will have spinners mounted thereon rotated in different directions and at relatively different speeds whereby to serve as an attraction or lure to fish and urge the same to strike at the lure and thus be caught on a hook associated with the lure.

Another object of this invention is to provide an improved spinner type fishing lure which includes a rod having mounted thereon a pair of spinners, said spinners being formed of plates stamped into a transversely curved shape and adapted to be secured to said elongated rod along one edge of each of the same.

A further object of this invention is to provide an improved spinner type lure which includes a pair of spinners which are of an improved construction, each of said spinners being formed of a generally rectangular plate and having the effect of a blade when passing through the water whereby the same is rotated, said spinners being quickly and easily formed whereby the lure is economically feasible.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a side elevational view of the improved spinner type lure, which is the subject of this invention, the direction of rotation of spinners thereof being indicated by arrows;

Figure 2 is a side elevational view of one of the spinners detached and shows the general outline thereof; and Figure 3 is a transverse vertical sectional view taken substantially upon the plane indicated by the section line 3—3 of Figure 2 and shows the general cross section of one of the spinners.

Similar characters of reference designate similar or identical elements and portions throughout the specification and throughout the different views of the drawings.

Referring now to the drawings in detail, it will be seen that there is illustrated in Figure 1 the improved spinner type lure, which is the subject of this invention, the lure being referred to in general by the reference numeral 10. The lure 10 includes an elongated rod 12 which has end portions thereof reversely turned and twisted to form loops 14 and 16. Mounted on the rod 12 adjacent the loop 14 is a first ball bearing 18 which has engaged therewith a first spinner 20. Disposed adjacent the other end of the first spinner 20 and carried by the rod 12 is a second ball bearing 22, the ball bearing 22 being disposed adjacent a forward edge of a second spinner 24. Disposed between the rear edge of the second spinner 24 and the loop 16 is a third ball bearing 26. Connected to the loop 14 of the lure 10 is a leader 28 of a fishing line, and carried by the loop 16 is a conventional fishhook 30.

Referring now to Figure 2 in particular, it will be seen that there is a side elevational view of the spinner 20 after the same has been rotated approximately 90° from the position illustrated in Figure 1. It will be noted that the spinner 20 is formed of a plate 32 with one side edge thereof flat and straight, the one side edge being referred to by the reference numeral 34. Integral with and extending outwardly from the one side edge 34 are attaching lugs 36 and 38. The atttching lug 36 is adapted to engage the ball bearing 18 and the attaching lug 38 is adapted to engage the ball bearing 22. It will be noted that the attaching lugs 36 and 38 are provided with aligned apertures 40 therethrough receiving the elongated rod 12.

The plate 32 is transversely curved with the curvature decreasing from the portion adjacent the one edge 34 towards the other edge. It will be understood that the curvature of the plate 32 adjacent the other or free edge of the same along any line normal to the rod 12 will be substantially equal to the curvature of a circle through which the intersection of the line and the free edge, which is referred to by the reference numeral 42, rotates. The transversely curved portion of the plate 32 is referred to by the reference numeral 44 and the axis thereof diverges slightly rearwardly from the one edge 34 and has an angle of incidence with respect thereto. It will be noted that the forward end of the axis of the curved portion 44 is vertically offset with respect to the forward end of the one edge 34 and the rear end of the axis is generally in the same plane with the rear end of the said one edge 34. Due to the position of the longitudinal axis of the curved portion 44, the free edge 42, which is in generally spaced parallel relation to the axis of the curved portion 44, also slopes downwardly and rearwardly. The curved portion 44 is connected to the said one edge 34 by a rearwardly diverging curved portion 46 which is of a reversed curvature with respect to that of the curved portion 44.

It will be seen that when the lure 10 is moved forwardly through water the pressure of the water on the curved portion 44 will result in the counter-clockwise rotation of the spinner 20, as viewed from the front end of the lure 10. In order that the rotating spinner 20 may progressively engage the onrushing water, the leading edge 48 thereof is outwardly and rearwardly tapered, as is best illustrated in Figure 2. It will be noted that the spinner 24 is quite similar to the spinner 20 and differs therefrom only in that the various portions thereof are reversed with respect to the straight edge which is provided with the attaching lugs, such as the lugs 36 and 38 of the spinner 20. The reverse formation of the spinner 24 results in the clockwise rotation thereof as the lure 10 is moved through water. It will be noted that the spinners 20 and 24 rotate in opposite directions and therefore give an optical effect which will attract fish. In order to vary this optical effect, and at the same time to give a wobbling motion to the lure 10, the angles of incidence of the spinners 20 and 24 are slightly different whereby the spinners rotate at different speeds. It will be seen that as the spinner type lure 10 moves through water the effect of the rotating spinners 20 and 24 is such as to give the lure the appearance of a fish traveling through the water and causes a larger fish to strike at the same. When the larger fish strikes at the lure 10 it is engaged with the fishhook 30 and thereby caught.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

A spinner type fish lure comprising an elongated rod and a pair of spinners mounted on said rod for rotation at different speeds and in opposite directions, each of said spinners consisting of a single sheet of material in trough shape having one longitudinal edge straight with eyes at the ends thereof transverse to the edge for reception of the rod therein, the opposite longitudinal edge being straight for a major portion of the length thereof and non-parallel to the straight edge, a forward edge being approximately in a plane at an acute angle to the rod and defining a reverse curve extending between the longitudinal edges, a rear edge having a curve different than the curve of the forward edge and extending between the longitudinal edges, and the trough shape including a bottom concave in section transversely for the major portion of its length and concave in the reverse direction longitudinally.

References Cited in the file of this patent

UNITED STATES PATENTS

| | | |
|---|---|---|
| 1,002,785 | Telford | Sept. 5, 1911 |
| 1,292,865 | Olt | Jan. 28, 1919 |
| 1,503,901 | Jones, Jr. | Aug. 5, 1924 |
| 1,620,972 | Hobbs | Mar. 15, 1927 |
| 1,920,676 | Burckhardt | Aug. 1, 1933 |
| 2,497,807 | Wood | Feb. 14, 1950 |
| 2,585,494 | Pelto | Feb. 12, 1952 |